(12) United States Patent
Teruhiko

(10) Patent No.: US 6,233,365 B1
(45) Date of Patent: *May 15, 2001

(54) IMAGE-PROCESSING METHOD

(75) Inventor: Matsuoka Teruhiko, Chiba (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,252

(22) Filed: May 6, 1997

(30) Foreign Application Priority Data

May 27, 1996 (JP) .................................... 8-132222

(51) Int. Cl.$^7$ ...................................................... G06K 9/32
(52) U.S. Cl. ........................................... 382/298; 382/156
(58) Field of Search .................................. 382/155–157, 382/299–300, 298, 158, 159; 358/455, 458, 462, 464

(56) References Cited

U.S. PATENT DOCUMENTS

| | | | | |
|---|---|---|---|---|
| 4,742,399 | * | 5/1988 | Kitamura | 382/299 |
| 5,109,282 | * | 4/1992 | Peli | 358/466 |
| 5,162,899 | * | 11/1992 | Naka et al. | 382/156 |
| 5,164,837 | * | 11/1992 | Hirosawa | 382/296 |
| 5,177,625 | * | 1/1993 | Nakashima et al. | 358/468 |
| 5,309,525 | * | 5/1994 | Shimomura et al. | 382/156 |
| 5,450,526 | * | 9/1995 | Yukichi et al. | 382/156 |
| 5,495,542 | * | 2/1996 | Shimormura et al. | 382/156 |
| 5,548,697 | * | 8/1996 | Zortea | 382/159 |
| 5,606,646 | * | 2/1997 | Khan et al. | 382/158 |
| 5,617,484 | * | 4/1997 | Wada et al. | 382/156 |
| 5,680,481 | * | 10/1997 | Prasad et al. | 382/159 |

FOREIGN PATENT DOCUMENTS 612486  1/1994  (JP) .

OTHER PUBLICATIONS

"Interpolating Images To Higher Resolution Using A Feedforward 'Neural' Network" IBM Technical Disclosure Bulletin, vol. 35, No. 1A, Jun. 1, 1992, pp. 340–342, XPOO308889 *p. 340–341*.
Oliver M A et al: "Operations On Quadtree Encoded Images" Computer Journal, vol. 26, No. 1, Feb. 1, 1983, pp. 83–91, XP00O743615.
Rumelhart D E et al: "Learning Representations By Back–Propagating Errors" Nature, vol. 323, No. 6088, Oct. 9, 1986, pp. 533–536, XP000561969.
Yao Wang et al: "Edge Preserved Image Zooming"Signal Processing: Theories And Applications, Grenoble, Sep. 5–8, 1988, vol. 3, No. Conf. 4, Sep. 5, 1988, pp. 1445–1448, XPOOOO93910 Lacoume J L; Chehikian A; Martin N; Malbos J.
Ahmed et al. "High–fidelity image using radial basis function neural networks" IEEE Naecon 1995 vol. 2 pp. 588–592.*

* cited by examiner

Primary Examiner—Amelia Au
Assistant Examiner—Jingge Wu
(74) Attorney, Agent, or Firm—Dike, Bronstein, Roberts & Cushman, LLP; David G. Conlin; William J. Daley, Jr.

(57) ABSTRACT

An image-processing method is provided with the first step of dividing an input image having n(n>1) gray scales into a plurality of matrixes, the second step of carrying out at least either a resolution-converting process or a variable magnification process for each of the divided matrixes, by using a hierarchical neural network that can execute a learning process for each input image, and the third step of outputting the image processed in the second step as an output image having n gray scales. Thus, the weights adjustment of the network can be carried out on each input image whatever image is inputted thereto; therefore, it is possible to always provide an optimal converting process.

10 Claims, 8 Drawing Sheets

FIG. 6
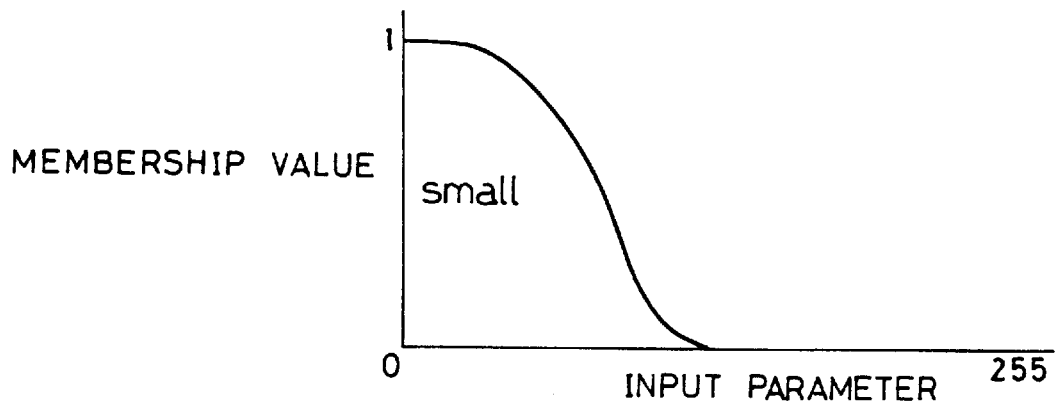
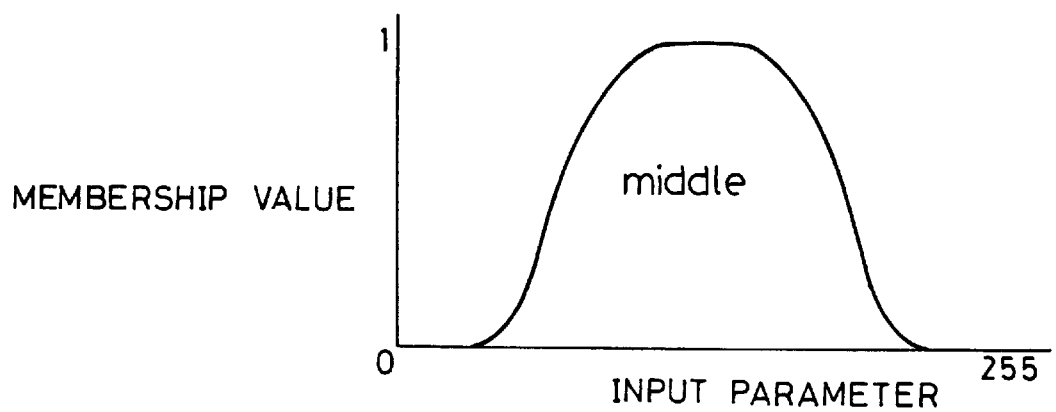
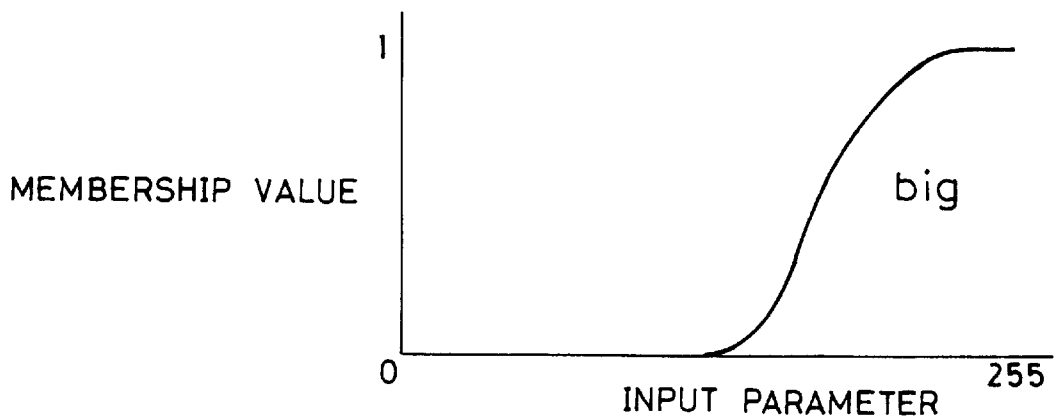

FIG.7(a) SIMPLE INTERPOLATION
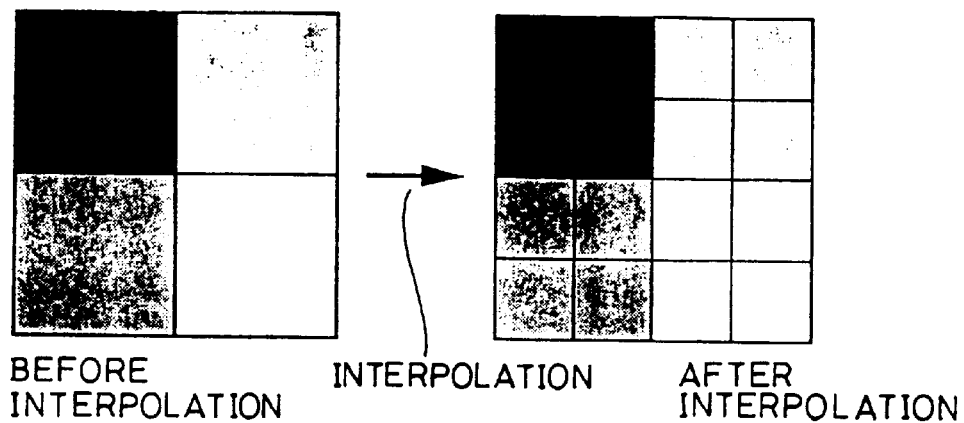
BEFORE INTERPOLATION → INTERPOLATION → AFTER INTERPOLATION
FIG.7(b) AVERAGE METHOD
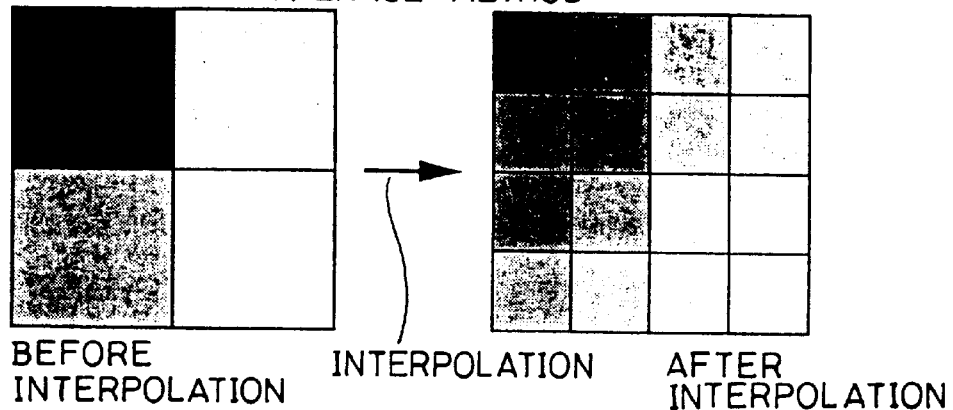
BEFORE INTERPOLATION → INTERPOLATION → AFTER INTERPOLATION
FIG.7(c) LINEAR INTERPOLATION METHOD
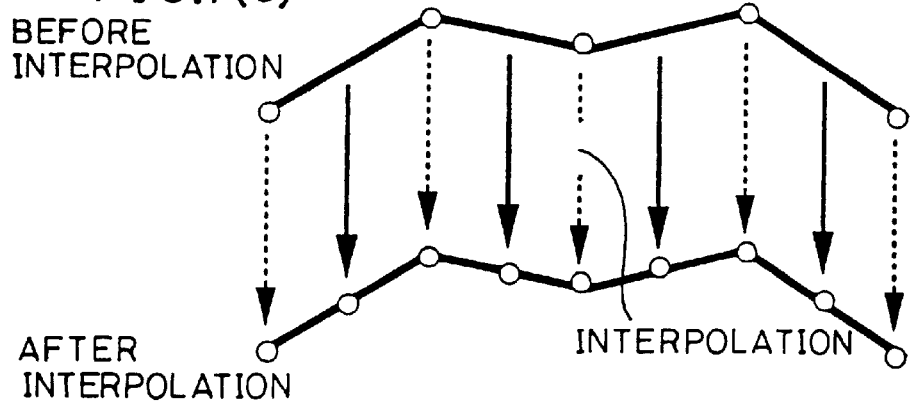
BEFORE INTERPOLATION
AFTER INTERPOLATION
INTERPOLATION

SIMPLE ENLARGEMENT

FIG. 8 (a)

BEFORE ENLARGEMENT → ENLARGEMENT → AFTER ENLARGEMENT

AVERAGE METHOD

FIG. 8 (b)

BEFORE ENLARGEMENT → ENLARGEMENT → AFTER ENLARGEMENT

FIG. 8 (c) LINEAR INTERPOLATION METHOD

BEFORE ENLARGEMENT

ENLARGEMENT

AFTER ENLARGEMENT

IMAGE-PROCESSING METHOD

FIELD OF THE INVENTION

The present invention relates to an image-processing method in which with respect to an input image with n(n>1) gray scales, a conversion process is applied so as to convert the resolution and magnification of the image and to obtain an output image with n gray scales.

BACKGROUND OF THE INVENTION

Conventionally, various methods have been proposed as image-processing methods which apply conversion processes to an input image with n(n−1) gray scales so as to convert the resolution and magnification of the image and obtain an output image with n gray scales.

With respect to methods for converting the resolution of an image, a simple interpolation method, which uses pixel values prior to an interpolation as peripheral interpolated pixel values after the interpolation has been carried out as shown in FIG. 7(a), and an average method, which uses the average value of pixel values prior to an interpolation as pixel values after the interpolation has been carried as shown in FIG. 7(b), have been known.

Moreover, a linear interpolation method, which connects respective pixel values with straight lines prior to an interpolation and which uses values on the straight lines as interpolation values, for example, as shown in FIG. 7(c), is known as another method for converting the resolution of an image. At present, this linear interpolation method is most widely adopted.

With respect to methods for converting the magnification of an image, a simple interpolation method, which uses pixel values prior to an interpolation as peripheral varied magnification pixel values after the interpolation has been carried out as shown in FIG. 8(a), and an average method, which uses the average value of pixel values prior to an interpolation as varied magnification pixel values after the interpolation has been carried out as shown in FIG. 8(b), have been known.

Moreover, a linear interpolation method, which connects respective pixel values with straight lines prior to an interpolation and which uses values on the straight lines as interpolation values, for example, as shown in FIG. 8(c), is known as another method for converting the resolution of an image. At present, this linear interpolation method is most widely adopted.

The above-mentioned methods, however, cause a problem in which an image, which has been subjected to the resolution-converting process or the variable-magnification process, has blurred edge portions or burred slanting lines, resulting in a lack of smoothness.

In order to solve this problem, for example, "Image-Interpolating Apparatus", disclosed in Japanese Laid-Open Patent Publication 12486/1994 (Tokukaihei 6-12486), carries out a non-linear enlarging process on an input image by using a neural network so that the image that appears after the process has sharpness in its edge portions and has its burred slanting lines masked, resulting in a smooth image.

The enlarging process in the image-interpolating apparatus in the above-mentioned laid-open patent publication is explained as follows: First, four pixel regions including a focused pixel, its right-hand adjacent pixel, its lower adjacent pixel and its diagonal lower adjacent pixel are extracted from a binary image. Next, provided that the values of the pixels in the four pixel regions are altered, that is, provided that the focused pixel is enlarged K times in the main scanning direction and L times in the sub-scanning direction, pixels in the enlarged region are statistically analyzed to find such pixels in the enlarged region as to be smoothly connected to the peripheral pixels, and by using the results as teaching signals and the values of the respective pixels in the four pixel regions as input signals, a learning operation for the neural network is preliminarily carried out. Then, the enlarging process of the inputted binary image is carried out by using the neural network after having been subjected to the learning operation.

However, in the enlarging process by the image-interpolating apparatus as disclosed in the above-mentioned laid-out patent publication, since the neural network, which has been subjected to a learning operation using statistical data that has been preliminarily provided, is adopted, weights at the connecting sections of the neural network after the learning operation has been carried out are fixed. For this reason, fine adjustments of the weights cannot be made by applying re-learning operations; thus, the resulting problem is that in the case of insufficient statistical data, it is not possible to obtain smoothly enlarged images depending on various input images.

SUMMARY OF THE INVENTION

The objective of the present invention is to provide an image-processing method by which, irrespective of an image to be inputted, it becomes possible to obtain an output image having smooth edge portions and slanting lines even when the resolution and magnification of the image is converted.

In order to achieve the above-mentioned objective, the image-processing method of the present invention divides an input image having n(n>1) gray scales into a plurality of matrixes, carries out at least either a resolution-converting process or a variable magnification process for each of the divided matrixes, by using a hierarchical neural network that can execute a learning process for each input image, and outputs a processed image having n gray scales as an output image.

With the above-mentioned arrangement, since the resolution-converting process and variable magnification process are carried out on each of the divided matrixes of the input image by using the hierarchical neural network that can execute a learning process for each input image, it becomes possible to sharpen edge portions of the output image and also to make slanting lines thereof smooth without burs. Moreover, since the hierarchical neural network can carry out a learning process on each input image, the learning process is applicable at any desired time. Thus, the weights adjustment of the connecting sections of the neural network can be carried out on each input image on a real-time basis; therefore, irrespective of images to be inputted, the relationship between the input image and output image can be optimized.

As described above, since at least either the resolution-converting process or the variable magnification process is carried out on each of the divided matrixes of the input image by using the hierarchical neural network which can execute a learning process on a real-time basis, the weights of the network is adjusted for each matrix; thus, it becomes possible to always carry out an optimal converting process.

Therefore, irrespective of images to be inputted, it is possible to eliminate the blurred state of the edge portions and burs in the slanting lines which are problems caused by the converting processes, and consequently to make the image after the conversion smooth, thereby improving the quality of the converted image.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a graph that shows a membership function.

FIG. 7(a) is an explanatory drawing that indicates a resolution-converting method using the conventional simple interpolation method.

FIG. 7(b) is an explanatory drawing that indicates a resolution-converting method using the conventional average method.

FIG. 7(c) is an explanatory drawing that indicates a resolution-converting method using the conventional linear interpolation method.

FIG. 8(a) is an explanatory drawing that indicates a variable-magnification processing method using the conventional simple interpolation method.

FIG. 8(b) is an explanatory drawing that indicates a variable-magnification processing method using the conventional average method.

FIG. 8(c) is an explanatory drawing that indicates a variable-magnification processing method using the conventional average method.

DESCRIPTION OF THE EMBODIMENT

The following description will discuss one embodiment of the present invention.

Figure 1:
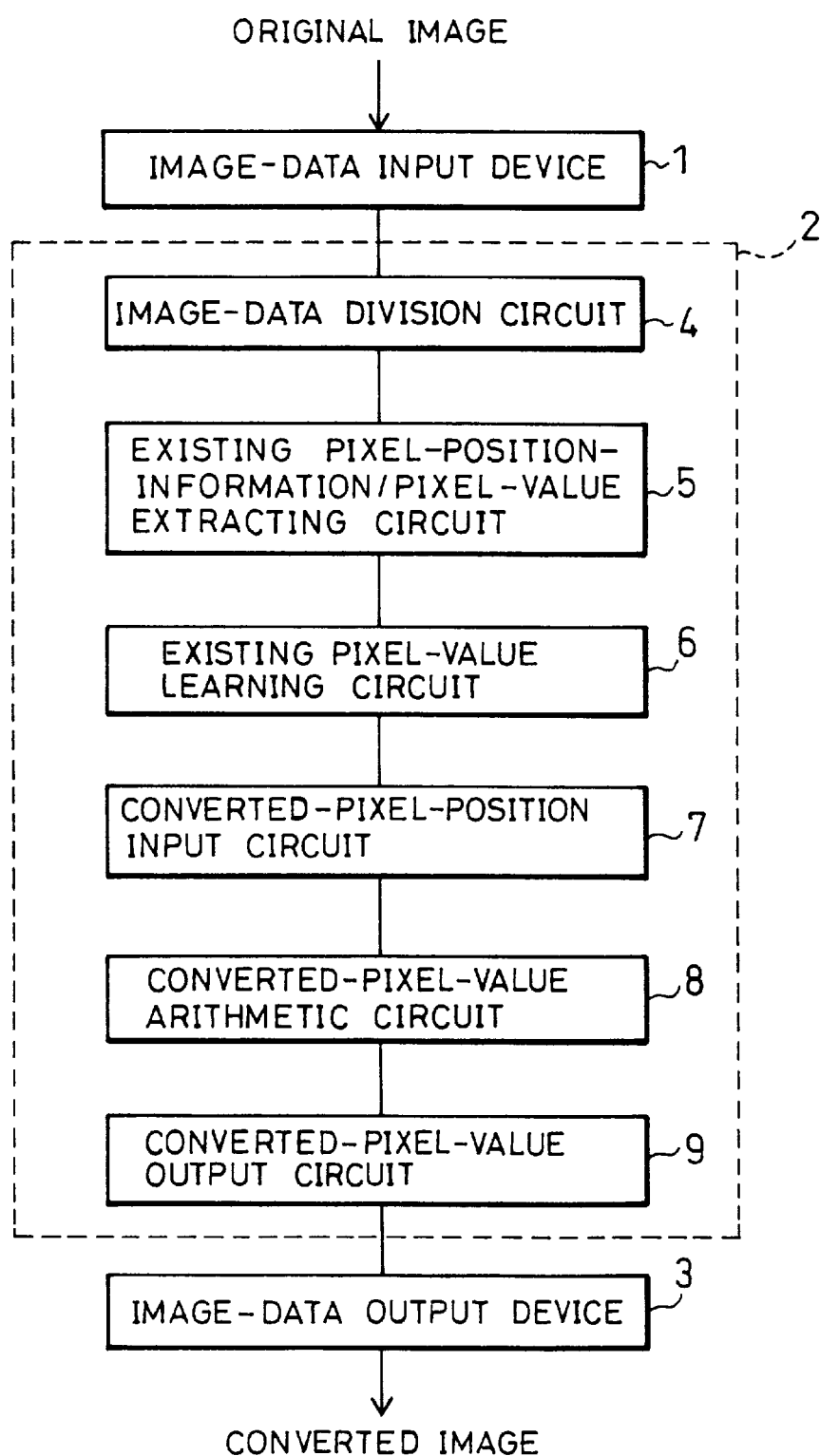
FIG. 1 is a schematic block diagram showing an image-processing apparatus to which an image-processing method of the present invention is applied.

As illustrated in FIG. 1 an image-processing apparatus, which uses an image-processing method of the present embodiment, is provided with an image-data input device (image-data input means) 1, an image-data conversion device 2, and an image-data output device (image-data output means) 3. When an original image having n(n>1) gray scales is inputted thereto, the image-processing apparatus carries out converting processes of resolution and magnification on the original image so that a converted image having n gray scales is outputted.

In other words, the image-processing apparatus outputs the image that is obtained by applying converting processes to the input image in accordance with the following steps:

First, the image-data input device 1 reads an original image having n gray scales as image data by using an image-reading means such as a scanner, not shown.

Next, the image-data conversion device 2 carries out converting processes of resolution and magnification on the image data that has been read by the image-data input device 1. The converting processes in the image-data conversion device 2 will be described later in detail.

Finally, the image-data output device 3 stores the image data whose resolution and magnification have been converted by the image-data conversion device 2 in a storage means such as a memory. Thereafter, the image-data output device 3 carries out an output process on the image data that has been stored in the storage means, and the processed image is outputted as a converted image having n gray scales.

The following description will discuss the image-data conversion device 2 in more detail.

In order to carry out the converting processes of resolution and magnification on the inputted original image, the image-data conversion device 2 is provided with an image-data division circuit 4 which serves as an image-data division means, and an existing pixel-position-information/pixel-value extracting circuit (existing pixel-position information/pixel-value extracting means) 5, an existing-pixel-value learning circuit (learning means) 6, a converted-pixel-position input circuit (converted-pixel position-input means) 7, a converted-pixel-value arithmetic circuit (converted-pixel-value arithmetic means) 8 and a converted-pixel-value output circuit (converted-pixel-value output means) 9, which serve as a conversion-processing means.

The image-data division circuit 4 is designed to divide the image data (hereinafter, referred to as input image data) that has been read by the image-data input device 1 into matrixes in accordance with the positional information of respective pixels.

In this case, the size of each of the divided matrixes is basically set smaller than the input image data; and when simplicity and high speeds of arithmetic operations are taken into consideration, the longitudinal and lateral sizes of each matrix are preferably set to divisors of the longitudinal and lateral pixel numbers of the input image data. Here, in the present embodiment, the size of input data is set to 255×255 pixels, and the size of each matrix is set to 3×3 pixels. Further, the resolution of the input image data is set to 300 dpi×300 dpi (longitudinal-lateral) with gray scales of n=256.

The existing pixel-position-information/pixel-value extracting circuit 5 is designed to extract positional information of each of the existing pixels contained in the input image data (hereinafter, referred to as partial image data) that has been divided by the image-data division circuit 4 into the matrix with the 3×3 pixel size and a pixel value at each position, as input data and teaching data for a hierarchical neural network, and stores the resulting data temporarily in a memory, not shown. Additionally, in the case of a variable magnification process, the positional information that exists after the variable magnification process is used as positional information of respective pixels to be extracted by the existing pixel-position-information/pixel-value extracting circuit 5.

The above-mentioned pixel value is a value indicating the gray scale, such as a concentration value and luminance value in each pixel of the image data. Further, the teaching data, obtained from the pixel value, is data that is supplied as a target value so that the hierarchical neural network can output a correct output value in response to each input value. In other words, the hierarchical neural network varies weights at the connecting sections of the network so that the output value becomes closer to the teaching data.

The existing-pixel-value learning circuit 6 gives the positional information of each pixel and the pixel value at each position that have been stored in the memory by the existing pixel-position-information/pixel-value extracting circuit 5 to the hierarchical neural network as input data and teaching data, thereby allowing the neural network to learn. The number of the learning processes carried out by the existing-pixel-value learning circuit 6 is set up to 1000 at maximum. However, in the case of a learning error of 5%, the learning process is completed even if the number of the learning processes has not reached 1000 times. The learning method will be described in detail later.

In the present embodiment, an explanation will be given of cases wherein a neural network of the back-propagation type and a fuzzy neural network are used as the above-mentioned hierarchical neural network. Additionally, the detailed explanations of the respective hierarchical neural networks will be given later together with the above-mentioned learning method.

Figure 2:
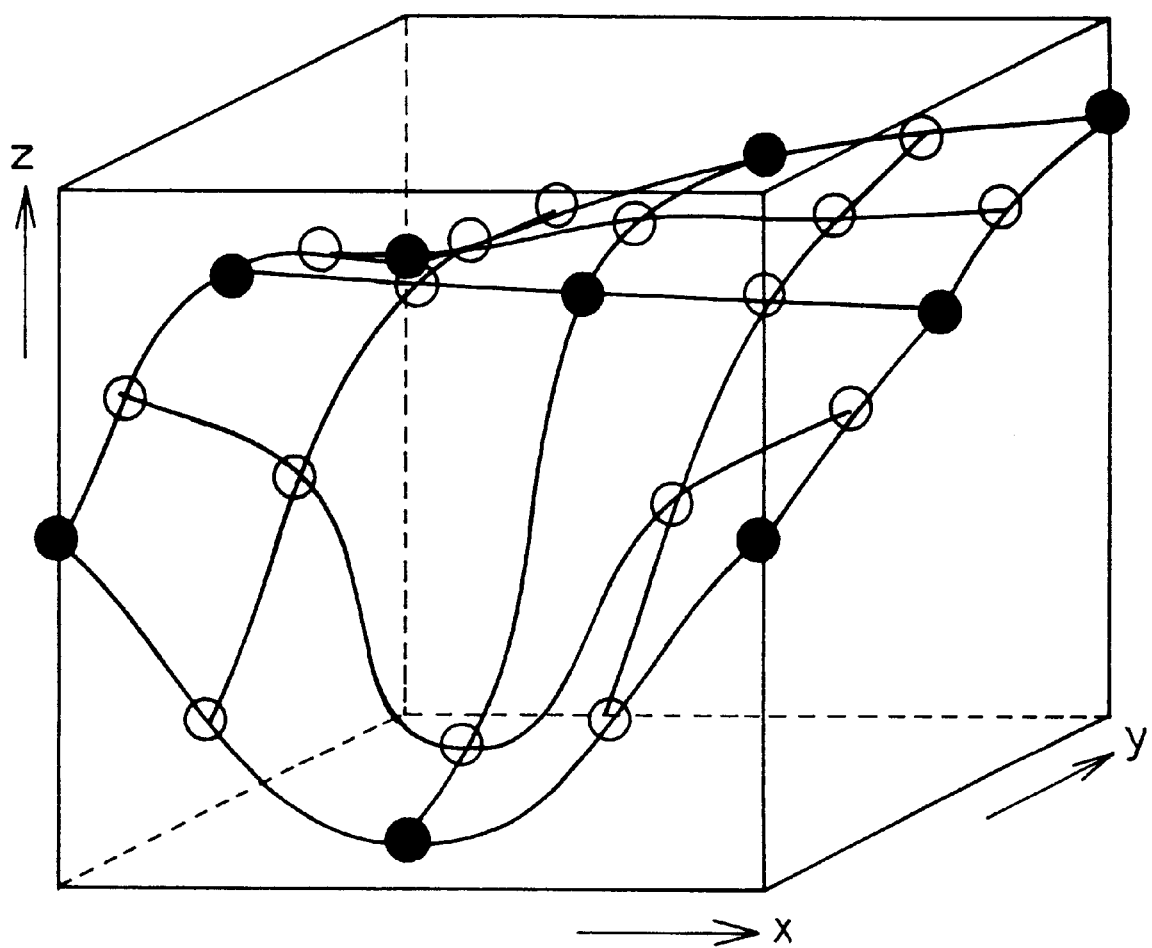
FIG. 2 is an explanatory drawing that shows a gray-scale curved surface.

When the hierarchical neural network is subjected to a learning process in the existing-pixel-value learning circuit 6, a gradation curved surface, which is formed by connecting existing pixel values with non-linear curves, is obtained as shown in FIG. 2. In FIG. 2, black circles ● represent existing pixels, white circles ○ represent interpolated pixels after conversion, x and y represent the x-axis and the y-axis of the respective input image data, and the z-axis represents the pixel value. Thus, FIG. 2 shows the results of a resolution-converting process that was carried out so as to double the resolution of the input image data with respect to the x-axis and the y-axis.

The converted-pixel position input circuit 7 inputs positional information of the respective pixels after the converting process to the hierarchical neural network that has been subjected to the learning process in the existing-pixel-value learning circuit 6. The coordinates of each white circle ○ in FIG. 2, that is, the values of x and y, correspond to positional information of each pixel after the converting process.

The converted-pixel-value arithmetic circuit 8 uses the hierarchical neural network to which the positional information has been inputted by the converted-pixel position input circuit 7, and calculates and obtains pixel values at the respective positions. The results, found by the converted-pixel-value arithmetic circuit 8, represent the portions indicated by the white circles ○, and the value z of each white circle ○ gives an interpolated pixel value.

The converted-pixel-value output circuit 9 allows the memory to store the converted pixel values that have been found by the arithmetic operations in the converted-pixel-value arithmetic circuit 8, and then outputs the values to the image-data output device 3 as image data after the converting process.

Here, referring to FIGS. 3 through 6, an explanation will be given of the two types of hierarchical neural network that are used in the existing-pixel-value learning circuit 6.

Figure 3:
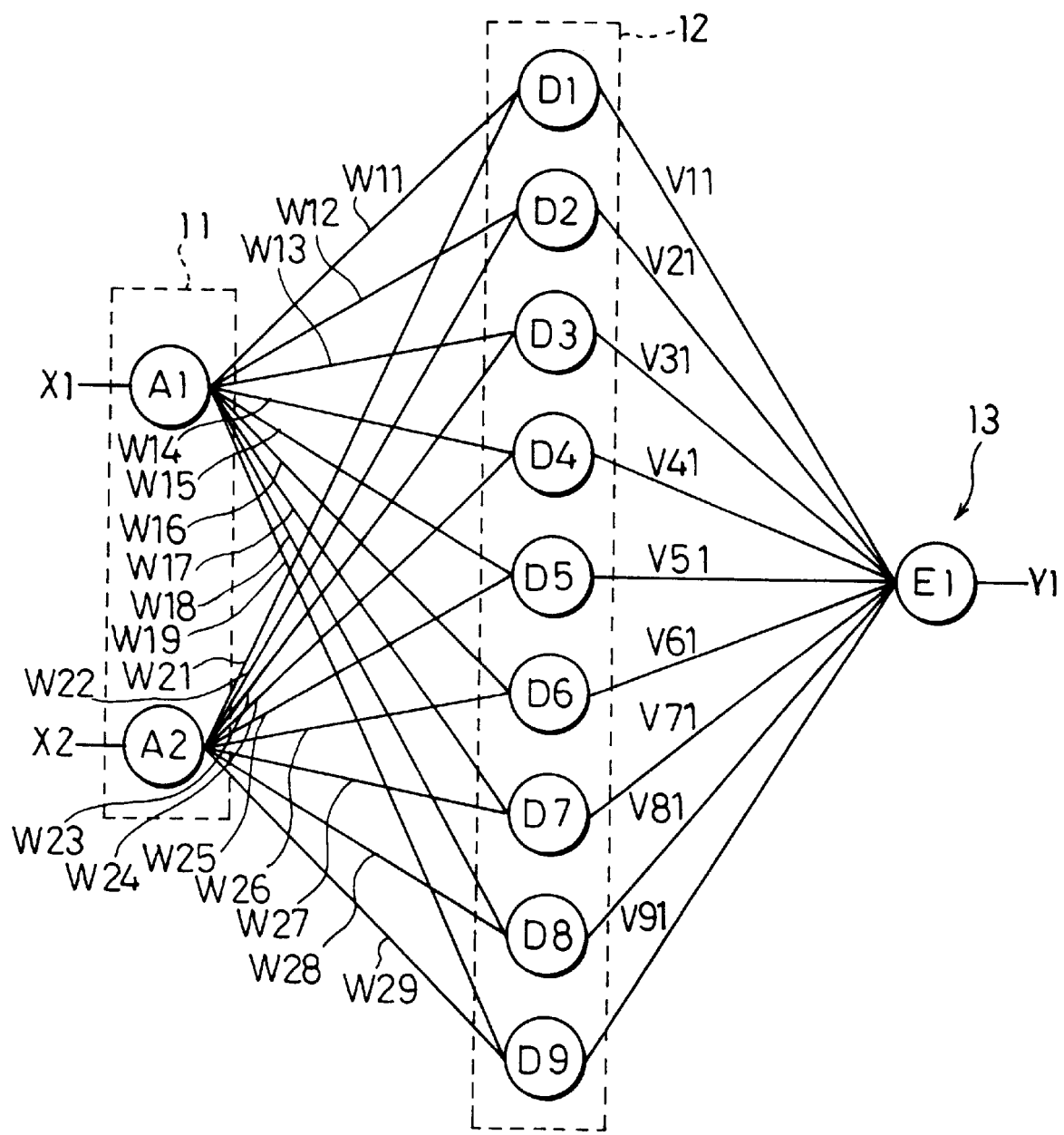
FIG. 3 is a schematic drawing that shows a neural network of the back-propagation type that is a hierarchical neural network applied to the image-processing apparatus of FIG. 1.

First, the following description will discuss a neural network of the back-propagation type. As illustrated in FIG. 3, this neural network has two inputs and one output, and is constituted by three layers including an input layer 11, an intermediate layer 12 and an output layer 13. In the above-mentioned neural network, the two input items are pieces of positional information of each pixel, and one output item is a pixel value at the inputted pixel position.

The input layer 11 is provided with two nodes, that is, a node A1 to which the input value X1 is inputted and a node A2 to which the input value X2 is inputted. The reference numerals X1 and X2 represent the positional information of each pixel; that is, X1 represents the positional information on the x-axis of each pixel, and X2 represents the positional information on the y-axis of each pixel.

The intermediate layer 12 is provided with nine nodes D1 through D9, and these nodes D1 through D9 are connected to the node A1 of the input layer 11 with weights W11 through W19, and also connected to the node A2 of the input layer 11 with weights W21 through W29. These weights W11 through W19 and W21 through W29 are adjusted through learning processes which will be described later.

Additionally, the number of nodes of the intermediate layer 12 is defined as the particular number of nodes in which, when learning processes were carried out by increasing the number of nodes in the intermediate layer 12 successively one by one from 1 by the use of sample image data, the learning process was carried out most precisely. Therefore, the number of nodes in the intermediate layer 12 is not necessarily limited to nine as is adopted in the present embodiment, and may be set at a desired number of nodes in light of the learning precision.

The output layer 13 is provided with one node E1, and the node E1 is connected to the nodes D1 through D9 of the intermediate layer 12 with weights V11 through V91. The weights V11 through V91 are determined through learning processes which will be described later, and its output is released as an output value Y1.

The following description will discuss a learning method of the neural network of the back-propagation type that is constructed as described above.

First, an explanation will be given of arithmetic operations in the forward direction from the input layer 11 to the output layer 13. Positional information of partial image data is first inputted to the input layer 11 as input data (X1·X2), and is outputted to the intermediate layer 12, as it is. In other words, this process is shown as follows:

$$Ii = Xi \quad [i=1,2] \tag{1}$$

Here, Ii represents an output value from each node of the input layer 11; and, for example, the output value of the node A1 is I1, and the output value of the node A2 is I2. Further, Xi represents input data indicating positional information of each pixel; and, for example, X1 represents input data indicating the positional information on the x-axis of each pixel, and X2 represents input data indicating the positional information on the y-axis of the pixel.

Next, in the intermediate layer 12, arithmetic operations are carried out based on the output values from the input layer 11, and the output values of the nodes D1 through D9 are determined. More specifically, the arithmetic operations are carried out in accordance with the following equation (2) between the input layer 11 and the intermediate layer 12.

$$Hj = f(Ii \cdot Wij + \theta 1j) \tag{2}$$

$[j=1,2,\ldots,9]$

Here, Hj is an output value from each node of the intermediate layer 12; and, for example, the output value of the node D1 is H1, and the output value of the node D2 is H2. Moreover, Wij is a weight that indicates the degree of connection between each node of the input layer 11 and each node of the intermediate layer 12; and, for example, the degree of connection between the node A1 of the input layer 11 and the node D1 of the intermediate layer 12 is W11. Furthermore, $\theta 1j$ is an offset value in each node of the intermediate layer 12.

Figure 4:
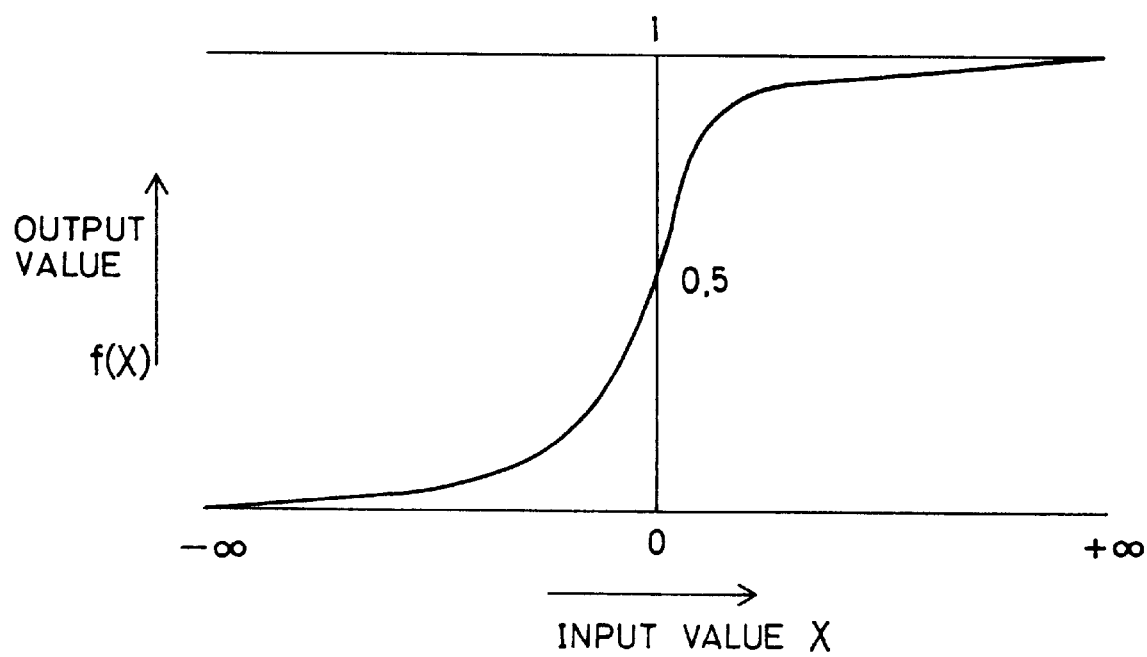
FIG. 4 is a graph shows a sigmoid function.

Supposing that the input value X is represented by $(Ii \cdot Wij + \theta 1j)$ in the above-mentioned equation (2), f(X) becomes a non-linear monotonically increasing function that monotonically increases with respect to the input value X, and a sigmoid function, for example, as shown in FIG. 4, is applied. The sigmoid function is represented by the following equation (3):

$$f(x) = \frac{1}{1+e^{-x}} \quad (3)$$

Finally, in the output layer 13, arithmetic operations are carried out based on the output values from the intermediate layer 12, thereby determining the output value of the node E1. More specifically, the arithmetic operations is carried out in accordance with the following equation (4) between the intermediate layer 12 and the output layer 13:

$$Ok = f(Hj \cdot Vjk + \theta 2k) \quad (4)$$

[k=1]

Here, Ok is the output value Y1 from the node E1 of the output layer 13. Further, Vjk is a weight that indicates the degree of connection between each of the nodes D1 through D9 of the intermediate layer 12 and the node E1 of the output layer 13; and, for example, the degree of connection between the node D1 of the intermediate layer 12 and the node E1 is V11. Furthermore, θ2k is an offset value in the node E1 of the output layer 13.

Supposing that the input value X is represented by (Hj·Vjk+θ2k) in the above-mentioned equation (4), f(X) becomes a non-linear monotonically increasing function that monotonically increases with respect to the input value X, and a sigmoid function, for example, as shown in FIG. 4, is applied in the same manner as the above-mentioned equation (2).

Next, the following description will discuss arithmetic operations in the reverse direction for learning processes.

The objective of the learning processes is to obtain an optimal input/output relationship in the neural network, and for this reason, the weights of the connecting points in the network are finely adjusted towards the teaching data as targets. A method for providing fine adjustments on the weights of the connecting points in the network will be explained below.

First, the squared error between the output value of the node E1 of the output layer 13 and the teaching data is calculated by using the following equation (5):

$$Ek = \frac{(Tk - Ok)^2}{2} \quad (5)$$

Here, Ek represents the squared error between the teaching data and the output value, and Tk represents the teaching data. In other words, the objective of the learning processes is to make Ek smaller. Therefore, by using the following equation (6), the effect of Ok in Ek is found by subjecting Ek to a partial differential with Ok.

$$\frac{\partial Ek}{\partial Ok} = -(Tk - Ok) \quad (6)$$

Further, the effect of the weight of the connection Vjk between the intermediate layer 12 and the output layer 13 in Ek and the effect of the weight of the connection Wij between the input layer 11 and the intermediate layer 12 in Ek are found by using the following equations (7) and (8):

$$\frac{\partial Ek}{\partial Vjk} = -(Tk - Ok) \cdot Ok \cdot (1 - Ok) \quad (7)$$

$$\frac{\partial Ek}{\partial ij} = Hj \cdot (1 - Hj) \cdot (-1) \sum_k \left( \frac{\partial Ek}{\partial Vjk} \cdot Vjk \right) \quad (8)$$

Based upon the effect in Ek found by the above-mentioned equations (7) and (8), the weights at the connections are finely adjusted by using the following equations (9) and (10):

$$Vjk(t+1) = Vjk(t) + \alpha \cdot \frac{\partial Ek}{\partial Vjk} \cdot Hj \quad (9)$$

$$Wij(t+1) = Wij(t) + \alpha \cdot \frac{\partial Ek}{\partial Wik} \cdot Ii \quad (10)$$

Here, α is a value indicating the degree at which the fine adjustment is carried out, and is normally set in the range of 0.05 to 0.25. Further, t represents the number of learning processes.

Therefore, in the above-mentioned equations (9) and (10), the weights at connections, which are to be used in the next arithmetic operation/learning process, are obtained by adding finely adjusting values to the present weights (Vjk, Wij) at connections.

As described above, by revising the weights at connections through the repeated learning processes based on the above-mentioned algorithms, the squared error between the teaching data and the output value can be made smaller to a certain extent. Then, the learning processes are completed at the time when a predetermined number of learning processes has been reached or when the value of the error has become not more than an acceptable value of the error. In the present embodiment, the predetermined number of learning processes is set to 1000 times, the acceptable value of the error is set to 5%, and the learning processes are completed at the time when the number of learning processes has reached 1000 times or when the error has become not more than 0.5%.

By the use of a neural network of the back-propagation type that has been subjected to the learning processes as described above, the resolution-converting process and variable magnification process are carried out on all the partial images of an inputted image; thus, the inputted image is subjected to the converting process, and an image having a converted resolution or an image having a varied magnification is obtained.

Figure 5:
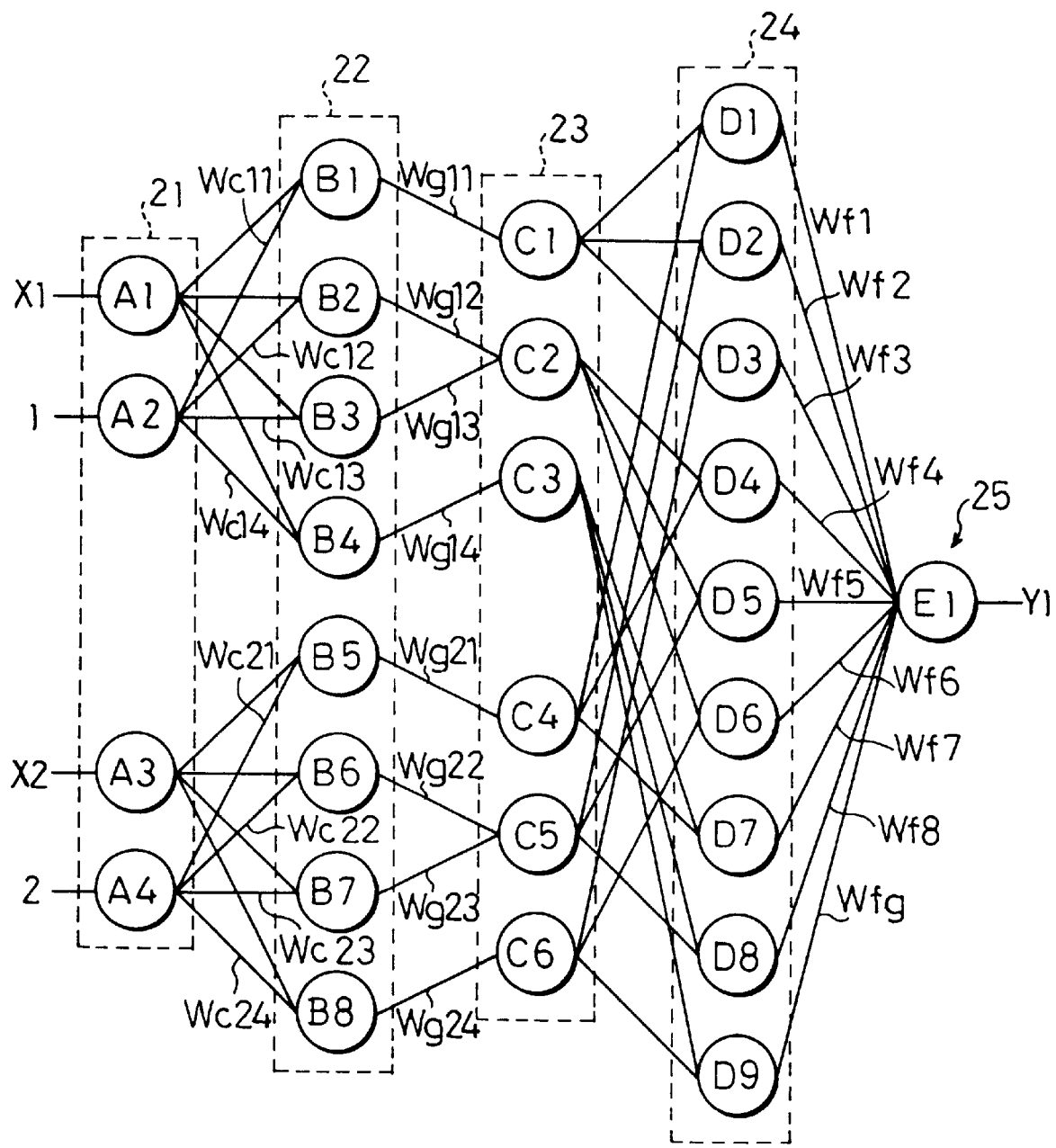
FIG. 5 is a schematic drawing that shows a fuzzy neural network that is a hierarchical neural network applied to the image-processing apparatus of FIG. 1.

Next, the following description will discuss a fuzzy neural network. As illustrated in FIG. 5, the present neural network has two inputs and one output, and is constituted by five layers including an input layer 21, the former-half of a membership layer 22, the latter-half of a membership layer 23, a rule layer 24 (these three layers serving as intermediate layers), and an output layer 25. Here, the second and third layers are combined into the membership layer. In the above-mentioned fuzzy neural network, two input items are pieces of positional information regarding each pixel, and one output item is a pixel value at the inputted pixel position.

In the above-mentioned fuzzy neural network, connections between nodes in the respective layers are constructed as follows:

First, the input layer 21 is constituted by two pairs of nodes A1, A2 and A3, A4, each pair corresponding to each input item. Here, a constant 1 is inputted to the nodes A2 and A4, and an input value X1 (positional information on the x-axis) is inputted to the node A1, and an input value X2 (positional information on the y-axis) is inputted to the node A3.

Next, in the membership layer, big, middle and small membership functions as shown in FIG. 6, are provided for each of the input items.

Therefore, in the former-half of the membership layer 22, two groups of four nodes B1 through B4 and B5 through B8 are provided, and in the nodes B1 through B4, the constant 1 and the input value X1 are connected, while in the nodes B5 through B8, the constant 1 and the input value X2 are connected. In the latter-half of the membership layer 23, two groups of three nodes C1 through C3 and C4 through C6 are provided, and one or two of the nodes of the former-half of the membership layer 22 are connected thereto.

More specifically, the nodes C1 and C4, which serve as portions for connecting one of the nodes of the former-half of the membership layer 22, form portions constituting the big membership function, and the nodes C3 and C6 form portions constituting the small membership function. Further, the nodes C2 and C5, which serve portions for connecting two of the nodes of the former-half of the membership layer 22, form portions constituting the middle membership function.

The nodes of the membership layer with the above-mentioned arrangement are inevitably provided for each input item; thus, the number of nodes for each item is fixed. In the present embodiment, the number of nodes of the former-half of the membership layer 22 for each input item is set at four, and the number of nodes of the latter-half of the membership layer 23 is set at three.

Next, in the rule layer 24, nodes D1 through D3 are constructed so that they are subjected to logical ANDs with the respective nodes C4 through C6 that are related to the input value X2 with respect to the node C1 that is related to the input value X1 of the latter-half of the membership layer 23. In the same manner, nodes D4 through D6 are constructed so that they are subjected to logical ANDs with the respective nodes C4 through C6 that are related to the input value X2 with respect to the node C2 that is related to the input value X1, and nodes D7 through D9 are constructed so that they are subjected to logical ANDs with the respective nodes C4 through C6 that are related to the input value X2 with respect to the node C3 that is related to the input value X1. In other words, in the rule layer 24, all the combinations of the membership values are given with respect to the two input values X1 and X2; thus, fuzzy logical ANDs are obtained.

Finally, the output layer 25 is provided with one node E1 so that all the outputs from the rule layer 24 are connected and an output value Y1, which is a pixel value at each pixel position of the input image, is released therefrom.

At the connecting sections between the nodes in the fuzzy neural network having the above-mentioned construction, each connection has a specific weight.

Accordingly, at the connecting sections between the input layer 21 and the former-half of the membership layer 22, center values of the membership functions (the input values which result in an output value of 0.5 in the membership functions) are weights Wc11 through Wc14 as well as Wc21 through Wc24.

In other words, three kinds of membership functions are provided as described earlier, and the center values of the respective membership functions are coincident with the respective weights. For example, the weight of the center value of the membership function indicating "big" of the input value X1 is Wc11, the weights of the center values of the membership function indicating "middle" are Wc12 and Wc13, and the weight of the center value of the membership function indicating "small" is Wc14. Here, in the case of "middle", two center values are obtained because logical ANDs of the two membership functions are carried out.

Next, at the connecting sections between the former-half of the membership layer 22 and the latter-half of the membership layer 23, gradients of the membership functions are Wg11 through Wg14 and Wg21 through Wg24. In this case, the gradients of the membership functions are coincident with the respective weights. For example, the weight of the gradient of the membership function indicating "big" of the input value X1 is Wg11, the weights of the gradients of the membership function indicating "middle" are Wg12 and Wg13, and the weight of the gradient of the membership function indicating "small" is Wg14. Here, in the case of "middle", two gradients are obtained because logical ANDs of the two membership functions are carried out.

Finally, at the connecting sections between the rule layer 24 and the output layer 25, knowledge acquired from "expert" is represented by weights Wf1 through Wf9. In the knowledge acquired from "expert", such a rule weight of combination of input values that makes the output value greater is defined as a value closer to 1, and such a rule weight of combination of input values that makes the output value smaller is defined as a value closer to 0. Other rule weights are initially defined as 0.5.

Moreover, the weights at the connecting sections other than the above-mentioned connecting sections, such as the weights at the connecting sections between the latter-half of the membership layer 23 and the rule layer 24, are fixed to 1.

In the fuzzy neural network having the above-mentioned arrangement, a method for finding the output values of the respective layers will be discussed below. Here, since the output values of the input layer 21 are the same as its input values, the explanation thereof is omitted.

As shown in the following equation (11), the membership layers add the center values Wc11 through Wc14 and Wc21 through Wc24 of the membership function in its second layer.

$$H_{i+j} = X_i + W_{cij} \tag{11}$$

($W_{cij} < 0$; i=1, 2; j=1,2,3,4)

Here, X represents the output value of the input layer 21, Wc represents the center value of the membership function, and H represents the output of the second layer. Further, i represents the number of the respective input items, and j is set to 1 in the case of "big", set to 2 or 3 in the case of "middle", and set to 3 in the case of "small".

The above-mentioned equation (11) indicates that the sigmoid function shown in the following equation (12), which is to be substituted later, has the position of its origin set at the center value of the membership function.

$$f(X) = \frac{1}{1 + e^{-x}} \tag{12}$$

Next, as shown in the following equation (13), in the third layer, by substituting multiplied gradients of the membership function into the sigmoid function, the output values of the membership function with respect to the input values at the respective regions are obtained. Here, in the case of "middle", instead of equation (13) the following equation (14) is applied:

$$Mik = f(Hij \cdot Wgij) \quad (13)$$

$$(k=1,2,3)$$

$$Mik = \min\{f(Hij \cdot Wgij), f(Hi(j+1) \cdot Wgi(j+1))\} \quad (14)$$

Here, Wg is a value of the gradient of the membership function, f(X) is the sigmoid function, M represents the output value of the membership function, and min{f(X1), f(X2)} represents a logical AND of f(X1) and f(X2). Further, k represents a node number of the latter-half of the membership layer 23, and θ is set to 1 in the case of "big", set to 2 in the case of "middle", and set to 3 in the case of "small". Moreover, in the above-mentioned equation (14), the smaller value is selected from the two functions inside the parenthesis of min by carrying out the logical AND.

Next, in the rule layer 24, a calculation is carried out on the AND rule by using the following equation (15): More specifically, with respect to each of the two input items, one is selected from the three regions (big, middle and small), and a logical AND is carried out on the two membership output values.

$$Rn = \min\{Mi1k1, Mi2k2\} \quad (15)$$

(i<i; i=1, i=2; k, k=1, 2, 3)

Here, R is the output value of the AND rule, and k1 and k2 are node numbers of the latter-half of the membership layer 23. In this case also, the smaller value is selected from the two functions inside the parenthesis of min by carrying out the logical AND.

Finally, in the output layer 25, the output value is calculated by using the following equation (16): In other words, calculations are carried out as follows: the output values of the respective AND rules, obtained by the preceding-item propositions of the fuzzy rule (for example, X1 is big), are multiplied by the value of the weight Wf of the connection resulted from the rule, and the resulting values are divided by the total value of all the outputs of the AND rules, and then the sum of the resulting values is found.

$$y = \frac{\sum_{n=1}^{9} (Rn \cdot Wfn)}{\sum_{n=1}^{9} Rn} \quad (16)$$

Here, n is a node number of the rule layer 24.

The above description shows calculating processes that are carried out from the time when input values were substituted in the fuzzy neural network to the time when the output values are obtained. Additionally, in the state where the fuzzy neural network having the above mentioned arrangement is first constructed, the values of the connections among the nodes of the respective layers are set to fixed values for the respective layers, and even if input values are substituted therein, the resulting output values are unreliable values, thereby failing to provide a correct simulation of the input-output relationship of the target object. In order to obtain the correct simulation, it is necessary to carry out adjustments on the weights of the connections. Therefore learning processes are required in the fuzzy neural network.

The following description will discuss the learning processes in the above-mentioned fuzzy neural network.

Output values of sample data, which represent the input-output relationship of a target object, are used as teaching data T, and by using the following equation (17), a squared error between the teaching data T and each of the output values y that are obtained from the input values (X1, X2, ... Xn) of the sample data by using the above-mentioned equations (11) through (16).

$$E = \frac{1}{2}(T - y)^2 \quad (17)$$

Here, E represents the squared error between the teaching data T and the output value y. The correct simulation of the input-output relationship of the target object is confirmed by making the error smaller.

One of the methods for decreasing the error is the back propagation method wherein a learning algorithm is used. The following description will discuss the learning algorithm:

When a partial differential is carried out on the above-mentioned equation (17) with respect to y, the following equation (18) is obtained; this equation indicates the effect on the output value y in relation to the error.

$$\frac{\partial E}{\partial y} = -(T - y) \quad (18)$$

Next, when a partial differential is carried out on the above-mentioned equation (17) with respect to Wf, the following equation (19) is obtained. In this case, the aforementioned equation (16) is substituted in y of the above-mentioned equation (17):

$$\frac{\partial E}{\partial Wfp} = \frac{\partial E}{\partial y} \frac{\partial y}{\partial Wfp} = -(T - y) \frac{R}{\sum_{n=1}^{9} Rn} \quad (19)$$

Next, when partial differentials are carried out respectively with respect to Wg and Wc on the above-mentioned equation (17), the following equations (20) and (21) are obtained: In this case, the aforementioned equations (16), (15) and (14), or the aforementioned equation (13) and (11), are substituted in the above-mentioned equation (17).

$$\frac{\partial E}{\partial Wgij} = \frac{\partial E}{\partial y} \frac{\partial y}{\partial Rp} \frac{\partial Rp}{\partial Mik} \frac{\partial Mik}{\partial Wgij} = \quad (20)$$

$$-(T-y) \cdot \sum_{r} \left[ \frac{Wfp \sum_{n=1}^{9} Rn - \sum_{n=1}^{9} (Rn \cdot Wfn)}{\left(\sum_{n=1}^{9} Rn\right)^2} \right] \cdot Mik \cdot (1 - Mik) \cdot Hij$$

$$\frac{\partial E}{\partial Wcij} = \frac{\partial E}{\partial y} \frac{\partial y}{\partial Rp} \frac{\partial Rp}{\partial Mik} \frac{\partial Mik}{\partial Hij} \frac{\partial Hij}{\partial Wcij} = \quad (21)$$

$$-(T-y) \cdot \sum_{r} \left[ \frac{Wfp \sum_{n=1}^{9} Rn - \sum_{n=1}^{9} (Rn \cdot Wfm)}{\left(\sum_{n=1}^{9} Rn\right)^2} \right] \cdot Mik \cdot (1 - Mik) \cdot Hgij$$

The above-mentioned equations (19) through (21) indicate the effect of the weight of each connection with respect to the error. Here, r in the above-mentioned equations (20) and (21) represents the number of the outputs of the AND rule selected from the weights that form membership functions to be corrected. The sum of the errors from the nodes of the rule layer 24 is found by using the number r.

The error as a whole can be reduced by correcting the weights in such direction as to decrease the effect. The amount of correction is represented by the following equations (22) through (24).

$$\Delta Wfp = -\alpha \frac{\partial E}{\partial Wfp} \quad (22)$$

$$\Delta Wgij = -\beta \frac{\partial E}{\partial Wgij} \quad (23)$$

$$\Delta Wcij = -\gamma \frac{\partial E}{\partial Wcij} \quad (24)$$

Here, α, β and γ represent learning parameters, which are parameters for determining the amount of correction of the weight that reduces the effect. Corrections as indicated by the following equations (25) through (27) are carried out using these parameters:

$$Wfp=Wfp+\Delta Wfp \quad (25)$$

$$Wgij=Wgij+\Delta Wgij \quad (26)$$

$$Wcij=Wcij+\Delta Wcij \quad (27)$$

The error is minimized by repeatedly carrying out learning processes in accordance with the above-mentioned algorithms so as to correct the weights. Then, the learning processes are completed at the time when the value of the error has become not more than an acceptable value of the error. The acceptable value of the error is predeterminately set, and in the present embodiment, the learning processes are completed at the time when it becomes not more than 5%.

The resolution-converting process or the variable-magnification process is carried out on all partial images of an inputted image by using the fuzzy neural network that has been subjected to the learning processes as described above; thus, the inputted image is subjected to converting processes, and a resulting image having the corresponding resolution or the corresponding varied magnification is obtained in more appropriate manner than the aforementioned neural network of the back-propagation type.

In the image-processing method of the present embodiment, upon carrying out a resolution-converting process or a variable-magnification process, the hierarchical neural network is first subjected to a learning process by the existing-pixel-value learning circuit 6, using pixel values of the existing pixels inside matrixes that have been divided by the image-data division circuit 4 as teaching data, as well as using positional information corresponding to the pixel values of the existing pixels as input data. After completion of the learning process, if the process in question is a resolution-converting process, interpolated pixel values are obtained by inputting positional information of the interpolated pixels, and if the process in question is a variable-magnification process, varied-magnification pixel values are obtained by inputting positional information of the pixels after the varied magnification.

As described above, since the resolution-converting process and variable magnification process are carried out on each of the divided matrixes of the input image by using a neural network of the back-propagation type or a fuzzy neural network each of which is the hierarchical neural network and can execute a learning process for each input image, it becomes possible to sharpen edge portions of the output image and also to make slanting lines thereof smooth without burs.

Moreover, since the hierarchical neural network can carry out a learning process on each input image, the input-output relationship can be optimized whatever image may be inputted. Thus, since at least either the resolution-converting process or the variable magnification process is carried out on each of the divided matrixes of the input image by using the above-mentioned hierarchical neural network which can execute a learning process on a real-time basis, the weights of the network is adjusted for each input image; thus, it becomes possible to always carry out an optimal converting process.

Therefore, irrespective of images to be inputted, it is possible to eliminate the blurred state of the edge portions and burs in the slanting lines which are problems caused by the converting processes, and consequently to make the image after the conversion smooth, thereby improving the quality of the converted image.

Moreover, the hierarchical neural network in the above-mentioned image-processing method is designed so that positional information of the respective pixels of an input image is used as inputs and pixel values corresponding to the inputted positional information of the pixels are used as outputs.

As described above, upon carrying out the resolution-converting process and the variable-magnification process with respect to an input image, the hierarchical neural network only requires positional information of the respective pixels of the input image as its inputs, and the resulting outputs represent pixel values at respective positions inside the matrixes of the input image; therefore, it is not necessary to provide a complicate input-output relationship in the neural network, and therefore, it is possible to apply a neural network of small scale with a simple construction.

Moreover, in the present image-processing method, upon carrying out the resolution-converting process and the variable-magnification process, the learning process of the hierarchical neural network is executed based upon the positional information of the existing pixels and the existing pixel values; therefore, only a small amount of calculations is required for the learning process, and a high-speed learning process is obtained. Thus, it becomes possible to carry out the resolution-converting process and the variable-magnification process of an image at high speeds.

Furthermore, since a neural network of the back-propagation type is used as the hierarchical neural network in the image-processing method, the converting process of an input image can be carried out by using a simple hardware construction, upon carrying out the resolution-converting process and the variable-magnification process with respect to the input image.

In the case when a fuzzy neural network with two inputs and one output is used as the hierarchical neural network, upon carrying out the resolution-converting process and the variable-magnification process with respect to an input image, it becomes possible to provide a more detailed gradation curved surface representing the partial images, although a more complex hardware construction is required compared with the above-mentioned neural network of the back-propagation type, and consequently to provide more optimal interpolated pixel values or varied-magnification pixel values than those of the neural network of the back-propagation type.

Additionally, in the present embodiment, the neural network of the back-propagation type shown in FIG. 3 and the fuzzy neural network shown in FIG. 5 are used as the hierarchical neural network; however, the present invention is not intended to be limited by these networks, and another hierarchical neural network having only connections that are directed from the input layer to the output layer may be applied to obtain the same effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing method comprising:
   a first step of dividing an input image having n(n>1) gray scales into a plurality of matrixes;
   a second step of carrying out at least either a resolution-converting process or a variable magnification process for each of the divided matrixes, by using a hierarchical neural network that can execute a learning process for each input image at real time;
   wherein said second step includes the sub-steps of:
      subjecting the hierarchical neural network to a learning process, using pixel values as the existing pixels inside matrixes as teaching data, as well as using positional information corresponding to the pixel values of the existing pixels as input data, and
      after completion of the learning process, if the process in question is a resolution-converting process, obtaining interpolated pixel values by inputting positional information of the interpolated pixels, and if the process in question is a varied-magnification process, obtaining varied-magnification pixel values by inputting positional information of the pixels after the varied magnification; and
   a third step of outputting the image processed in the second step as an output image having n gray scales.

2. The image-processing method as defined in claim 1, wherein the hierarchical neural network is designed so that positional information of the respective pixels of an input image is used as inputs thereof and pixel values corresponding to the inputted positional information of the pixels are used as outputs thereof.

3. The image-processing method as defined in claim 2, wherein the hierarchical neural network is a neural network of a back-propagation type including an input layer constituted by two nodes, an intermediate layer constituted by more than one node and an output layer constituted by one node.

4. The image-processing method as defined in claim 2, wherein the hierarchical neural network is a fuzzy neural network including an input layer constituted by two nodes, membership layers that are two layers forming membership functions respectively representing "big", "middle" and "small", a rule layer that makes combinations of all membership values with respect to two inputs so as to obtain fuzzy logical ANDs, and an output layer constituted by one node.

5. An image processing apparatus comprising:
   an image-data input device that reads an original image as image data having n(n>1) gray scales;
   an image-data division circuit that divides the image data that has been read by the image-data input means into matrixes in accordance with positional information of respective pixels;
   an image-data conversion device that carries out at least either a resolution-converting process or a variable magnification process for each of the matrixes divided by the image-data division means, by using a hierarchical neural network that can execute a learning process for each of the image data at real time;
   wherein the image-data conversion device includes:
      an existing pixel-position-information/pixel-value extracting circuit that extracts positional information of each of existing pixels contained in the image data that has been divided into the matrix and a pixel value at each position, as input data and teaching data for a hierarchical neural network,
      an existing pixel value learning circuit that gives the input data and teaching data that have been extracted by the existing pixel-position-information/pixel-value extracting circuit to the hierarchical neural network, thereby allowing the neural network to learn,
      a converted-pixel-position input circuit that inputs positional information of the respective pixels after the converting process to the hierarchical neural network that has been subjected to the learning process in the existing pixel value learning circuit,
      a converted-pixel-arithmetic circuit that calculates and obtains pixel values at the respective positions by using the hierarchical neural network to which the positional information of the respective pixels has been inputted by the converted-pixel-position input circuit, and
      a converted-pixel-value output circuit that outputs the converted pixel values that have been found by the converted-pixel-value arithmetic circuit to an image-data output device as image data after the converting process, and
   wherein the image-data outputting device outputs the image processed by the image-data conversion device as an output image having n gray scales.

6. The image-processing apparatus as defined in claim 5, wherein the image-data division means divides the inputted image data into matrixes, the longitudinal and lateral sizes of each matrix being set to divisors of the longitudinal and lateral pixel numbers of the input image data.

7. The image-processing apparatus as defined in claim 5, wherein the learning means allows the hierarchical neural network to finish the learning processes at the time when a predetermined number of learning processes has been carried out.

8. The image-processing apparatus as defined in claim 5, wherein the learning means allows the hierarchical neural network to finish the learning processes at the time when the learning error has reached a predetermined value of error.

9. An image-processing method comprising:
   a first step of dividing an input image having n(n>1) gray scales into a plurality of matrixes in accordance with positional data of respective pixels;
   a second step of obtaining pixel values of the respective pixels by using a hierarchical neural network that can execute a learning process for each input image at real time;
   a third step of using the pixel values obtained in the second step as teaching data for the hierarchical neural network, said third step including subjecting the hierarchical neural network to a learning process, using pixel values as the existing pixels inside matrixes as teaching data, as well as using positional information corresponding to the pixel values of the existing pixels as input data;
   a fourth step of carrying out at least either a resolution-converting process or a variable magnification process for each of the divided matrixes, by using the hierarchical neural network, wherein, after completion of the learning process, if the process in question is a resolution-converting process, obtaining interpolated pixel values by inputting positional information of the interpolated pixels, and if the process in question is a varied-magnification process, obtaining varied-magnification pixel values by inputting positional information of the pixels after the varied magnification; and a fifth step of outputting the image processed in the fourth step as an output image having n gray scales.

10. The image-processing method as defined in claim 2, wherein the third step includes a first substep of using the teaching data to obtain output values, by using the hierarchical neural network, a second substep of comparing the output values obtained in the first substep with the pixel values obtained in the second step to obtain an error value, a third substep of varying weights at connections in the hierarchical neural network for reducing the error value obtained in the second substep, and repeating the first, second, and third substeps for minimizing the error value obtained in the second substep, the first, second and third substeps being repeated until the error value obtained in the second substep is less than or equal to a predetermined value.

* * * * *